Jan. 20, 1953     E. H. WALLACE     2,625,981
METHOD OF MAKING PNEUMATIC TIRES
Filed Feb. 21, 1951     2 SHEETS—SHEET 1
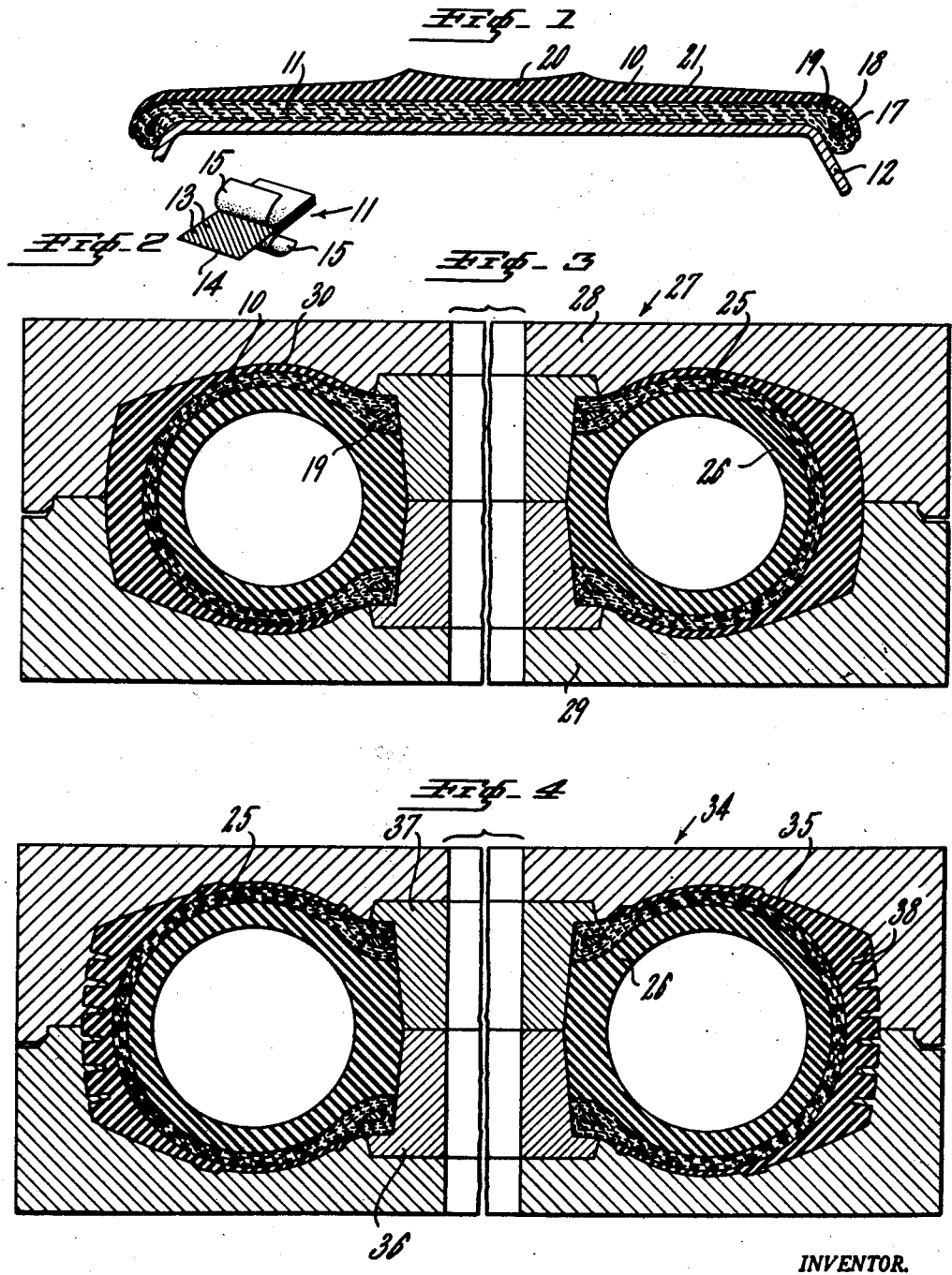
INVENTOR.
EDWARD H. WALLACE
BY James J. Long
AGENT

UNITED STATES PATENT OFFICE 2,625,981

METHOD OF MAKING PNEUMATIC TIRES

Edward H. Wallace, Detroit, Mich., assignor to United States Rubber Company, New York, N. Y., a corporation of New Jersey Application February 21, 1951, Serial No. 212,159

19 Claims. (Cl. 154—14)

This invention relates to an improved method of making pneumatic tires. In particular, the invention contemplates a method of making a pneumatic tire containing stranded reinforcing elements in the carcass, comprising the steps of anchoring firmly such reinforcing elements within the tire carcass, and thereafter stretching the reinforcing elements and maintaining them in such stretched condition while completing vulcanization of the tire.

In the manufacture of pneumatic tires, it is customary to form the carcass of rubberized stranded elements, most commonly textile elements, usually in the form of plied yarn or cord, disposed in layers or plies in the form of bias-cut fabric in which the reinforcing elements run generally transversely through the carcass at a suitable angle from bead to bead. It has been observed that tires, especially those reinforced with synthetic textile elements, exhibit an undesirable tendency to "grow," or to gradually increase in size in service. Such growth is the result of the tendency of the reinforcing elements to stretch under the influence of inflation and operating stresses. Elongation of the stranded reinforcement under tire inflation pressures and operating stresses may result in a growth of the tire to the extent that it produces tensile strains in the resilient outer rubber tread and sidewall covering material of the tire. When in such a strained condition the rubber is peculiarly susceptible to deterioration, particularly to that mode of cracking or checking due to attack by sunlight or the ozone in the atmosphere, with the result that the tire is subject to premature failure from this cause. The bases of the tread grooves are especially susceptible to such cracking when the rubber is under tension. The rubber under tension is also less resistant to abrasion, with the result that the useful life of the tire is shortened.

Accordingly, it is an object of the present invention to provide a method of making an improved pneumatic tire, reinforced with stranded elements, in which the tendency to growth is greatly reduced.

Another object of the invention is the provision of a method of making an improved tire reinforced with textile elements and exhibiting improved resistance to groove cracking and weather checking.

Still another object is to provide an improved method of manufacturing a textile reinforced pneumatic tire whereby any tendency to development of permanent tensile strain in the tread or sidewall portion of the tire during use is substantially reduced.

A further object of the invention is the provision of a textile reinforced tire having improved tread wear.

A still further object is to provide a method of reducing the tendency to growth of a nylon reinforced tire without impairing the fatigue resistance of the nylon.

Additional objects and advantages will be made evident in the following detailed description of the invention when read with reference to the accompanying drawings, wherein:

Fig. 1 is a transverse sectional view of a portion of a tire being assembled on a tire building drum in accordance with one method of carrying out the invention;

Fig. 2 is a perspective view of a portion of one of the plies from which the tire is built;

Fig. 3 is a transverse sectional view of the assembled and partially shaped tire in a mold wherein it is subjected to a preliminary cure of the carcass;

Fig. 4 is a transverse sectional view of the tire in a larger mold wherein it is subjected to stretching and completely cured in such stretched condition; and, Fig. 5 is a flow diagram representing one method of carrying out the invention.

Figure 5:
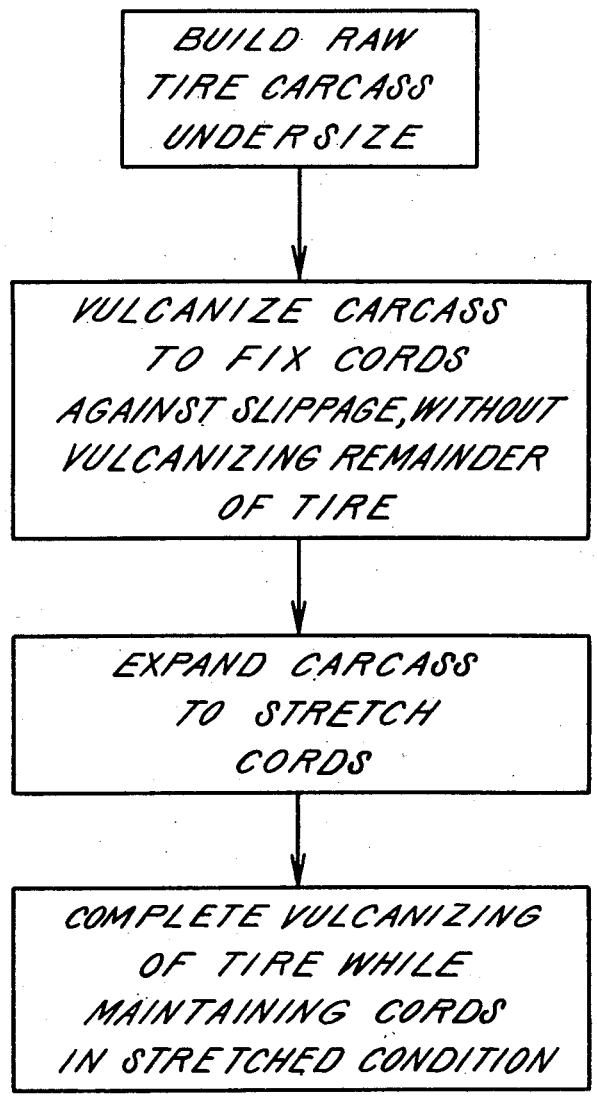

According to the method illustrated in Fig. 1 for carrying out the invention, the components of the tire are first assembled in a suitable manner, as on a tire building drum. Thus, the carcass 10 of a tire comprises a plurality of plies, in this case four plies, of rubberized tire fabric 11 is built up in band form on a building drum 12. As shown in Fig. 2, each ply 11 is made up of a parallel textile element 13, usually plied yarns or cords, such as cotton, rayon or nylon yarns or cords, in the form of a weak weft cord fabric treated with a resin-latex mixture, and coated on each side with a skim coating 15 of vulcanizable rubber carcass stock.

Inextensible bead elements 17, usually formed of a bundle of steel wires, are incorporated in the marginal edges of the carcass. Such bead elements extend circumferentially around the rim portions of the tire and are wrapped with the rubberized fabric strips 18 known as flipper strips, which aid in maintaining the bead elements in proper relation within the assembly. The free ends of the carcass plies 11 are wrapped around the bead assemblies. The overlapping portions of the plies extending upwardly into the sidewall region are known as the ply lock-ups. The portions 19 of the carcass in the neighborhood of the beads are hereinafter referred to as the bead areas of the tire. The carcass fabric is cut on a bias and is so disposed that the cords in the plies 11 run generally diagonally from bead to bead across the crown of the tire, alternate plies usually being arranged to run in opposite directions. Because the method of the present invention involves stretching the tire carcass during manufacture to a much greater extent than occurs in conventional practice, it is preferable to bias cut the carcass fabric at a somewhat lesser angle, say 1° to 3° less, than would be employed conventionally for the same finally desired cord angle. It will be understood that the angle of the reinforcing elements as applied on the building drum is in general not the same as the cord angle in the finally shaped tire, due to the extension of the carcass material which takes place as the tire is shaped.

The present invention is characterized by the fact that the carcass is built with substantially less than the normal "shoulder set," that is, the textile tire fabric is provided in less width from bead to bead than would be employed conventionally in a tire of the same design and finally intended size and the ends of the textile elements are fixedly anchored against slippage. The shoulder set employed is below normal to the extent that, in order for the tire to attain its finally intended size, the textile elements are stretched an appreciable proportion of their original substantially relaxed length as assembled on the building drum. Such stretching is imparted to the carcass prior to final vulcanization of the tire. The degree of stretching or elongation of the textile elements should be sufficient to remove a substantial portion of the tendency of the carcass elements to elongate or "grow" when the finished tire is subjected to inflation and operating stresses. It has been found that the objects of the invention are most advantageously attained when the shoulder set is below normal to the extent that the textile elements in the carcass are stretched in process of final vulcanization of the tire by at least 3%, of their original relaxed length, as assembled on the tire building drum. In the case of the usual nylon reinforcing material, which is the preferred reinforcing material employed in the invention, the degree of stretching is preferably in the range of from 6% to 12%. In the case of the usual rayon tire reinforcement the degree of stretching is preferably in the range of from 4% to 6% while the usual cotton tire cords are preferably stretched from 3% to 5% of their original relaxed length in the carcass. If desired, the textile elements may be stretched to a greater extent than the values indicated, e. g. the stretch may be 20% or even more in those cases where the elements have sufficiently high elongation to permit such stretching.

After assembly of the carcass, there is applied thereto the thread portion 20 and sidewall portion 21, which have been formed previously of suitable vulcanizable rubber stocks, usually by extrusion. The amount of rubber provided in the tread portion 20 and the sidewall portion 21 in the present method may be conventional, corresponding essentially to the amount usually used for a tire of the finally intended size.

Having thus provided less than the usual width of tire fabric in the manner described, the next step in the process is to anchor or fix the ends or lateral edges of the rubberized textile fabric plies so that the raw tire may be subsequently expanded to a larger size without slippage of the textile elements around the beads, thereby stretching the textile reinforcing elements substantially within the carcass. The desired anchoring of the reinforcing elements within the carcass is preferably effected by locally vulcanizing the tire carcass, especially in the bead areas 19, so that the overlapping ends of the rubberized fabric plies 11 adhere firmly to the bead assembly or to contacting portions of the plies and become incapable of slipping around the bead when tension is subsequently applied. At the same time, it is essential that the sidewall and tread portions, and preferably also the remainder of the carcass, remain essentially unvulcanized so that the tire may be subsequently expanded to a larger size to stretch the reinforcing elements and be completely vulcanized in such larger size while the reinforcing elements are in the stretched condition.

Referring to Fig. 3, there is shown therein a raw tire casing 25 which has been assembled undersize with respect to its width as described in connection with Fig. 1, and subsequently shaped in toroidal form with the aid of a vacuum shaping box (not shown), wherein an inflatable curing bag 26 is disposed within the tire casing. Since the tire carcass was built undersize, it is preferable to use a slightly smaller curing bag than is usually used with the final intended tire size, in order that it may be more easily inserted into the tire casing. It will be understood that the curing bag is equipped with the usual means (not shown) for introducing a fluid expanding and/or heating medium into its interior cavity. The casing 25 and curing bag 26 are placed in an annular tire mold 27 having separable halves 28 and 29 defining a toroidal confining cavity 30 for accommodating the tire. Internal fluid pressure is applied within the curing bag 26 to cause the tire to engage the walls of the mold cavity 30 in pressurized contact during the preliminary curing step. The mold assembly includes the usual toe rings which serve to maintain the beads or rims of the tire in place within the mold. The size of the cavity 30 is such that the tire casing fits therein with substantially no stretching, or very little stretching, of the carcass reinforcing elements when internal pressure is applied to the curing bag.

In order to anchor the carcass reinforcing elements in the bead areas 19, the tire casing 25 within the mold cavity 30 is subjected to such heating conditions that the bead areas of the carcass become vulcanized, while the tread and sidewall portions remain essentially unvulcanized. This may be accomplished by subjecting the interior of the tire casing to a temperature sufficient to effect vulcanization of the carcass 10 while the outside of the mold is subjected to a relatively lower temperature, insufficient to vulcanize the tread and sidewall portions. With the usual vulcanizable rubber stocks employed in tires it will generally be found satisfactory to subject the interior of the casing, as by circulating hot water in the curing bag, to a temperature within the range of from 250° to 375° F. for from 5 to 30 minutes while subjecting the mold to a lower temperature within the range of from 250° to 90° F. Under these conditions the carcass has imparted thereto an appreciable degree of vulcanization, sufficient to anchor the carcass textile reinforcing elements against slippage around the beads, while the sidewalls and tread undergo relatively little vulcanization, and remain susceptible to shaping and complete vulcanization in the finally intended size. The degree of vulcanization of the bead areas should be sufficient to prevent such areas from softening and permitting the textile elements to slip around the beads when heat and expansion stress are applied to the tire during subsequent final cure.

Having thus anchored the carcass plies against slippage, the undersize tire casing 25 is now ready for expansion to a larger size under the influence of internally applied pressure to impart the required degree of stretch to the textile reinforcing elements. This is accomplished, as shown in Fig. 4, by placing the tire casing 25 in a tire mold 34 having an appreciably larger cavity 35 than the previous mold. The mold cavity 35 is large enough to accommodate the tire in its finally intended size. The undersize casing 25 is caused to expand to a larger size by application of internal pressure within the curing bag 26, thereby filling out the cavity 35 and stretching the carcass reinforcing elements to the extent of at least 3% of their original relaxed length. To make this stretching possible the inner diameters or rims of the tire are maintained in place during the expansion with the aid of the usual toe rings 36 and 37 disposed within the mold. The mold also includes a tread block 38 for imparting an anti-skid pattern to the tire tread.

While the tire is in the mold 34, it is subjected to internal heating to vulcanize the tread and sidewall portions, and, if necessary, to complete the vulcanization of the carcass. At this stage it may be desirable to apply less than the conventional degree of heat to the interior of the carcass to avoid over-vulcanization thereof. The tire is thereby vulcanized in its final size and shape while the textile reinforcing elements are maintained in a stretched condition, such stretch having been made possible by the fact that the ends of the carcass plies have been fixedly anchored against slippage around the beads.

The completed tire is therefore characterized by the unique condition of having the textile reinforcing elements embedded in the carcass in a state of substantial stretch or elongation. As a result of this elongation, the embedded textile elements display a substantially reduced tendency to growth under inflation stresses, and therefore the tire does not tend to develop objectionable permanent tensile strains with consequent deterioration of the rubber.

Furthermore, the embedded textile elements have a tendency to retract when the tire is removed from the mold, and in so retracting they tend to place the rubber of the sidewall portions and tread portions of the tire in a state of compression. This effect is evidenced by the fact that the tire after removal from the mold is observed to shrink to an appreciably smaller size, such shrinkage being far in excess of that which would be occasioned by mere thermal contraction of the tire upon cooling. This effect is most pronounced in the case of nylon-reinforced tires.

Because the greater part of the stretch has been taken out of the carcass reinforcing elements during manufacture of the tire, and because of the tendency of the elements to retract, the tire can be inflated without imparting as great a tensile strain to the rubber therein as would be imparted to the rubber of a tire made in the conventional manner. The benefits of this effect are most readily observable in the improved resistance of the bases of the tread grooves to cracking. The bases of the tread grooves normally take up most of the tensile stress on the tire tread incident to application of inflation pressures. As a result, the rubber of the groove bases in conventional tires is normally under extension strain and, unless the tire is specially treated, cracks readily develop therein to the detriment of the appearance and useful life of the tire. The improved tire also has greater resistance to sidewall checking and improved tread wear as a result of the decreased tensile strains in the rubber.

The desired anchoring of the textile reinforcing elements may be accomplished by selectively applying heat to the bead areas of the tire, without subjecting the remainder of the tire to vulcanizing conditions, so that the bead areas are vulcanized while the remainder of the tire remains substantially unvulcanized. The degree of vulcanization of the bead area should be sufficient to prevent such areas from softening and permitting the reinforcing elements to become loose again when the entire tire is subsequently subjected to stretching and vulcanizing temperatures. Such fixing of the ends of the reinforcing elements may be accomplished either before preliminary shaping while the tire is in band form, or after preliminary shaping when the tire is in toroidal form.

In order to illustrate the invention, the production of an improved nylon tire of the 6.70–16/4 size will now be described in detail. The essential steps of the process may be followed by reference to the flow diagram, Fig. 5 of the drawings.

A tire carcass was built up in band form on a tire building drum, employing 4 plies of bias cut nylon tire fabric containing 210D/4/2 size nylon tire cords maintained in parallel relation by a coating of rubber-resin composition to form a cord fabric and skim coated on each side with the usual layers of vulcanizable rubber carcass stock. The cord angle of the bias cut fabric was about 60° on the tire building drum. The shoulder set was 16.25 inches, this being considerably less than the conventional shoulder set of 16.75 inches which would ordinarily be employed for a nylon tire of the same design and finally intended size. The shoulder set employed corresponded to that which would normally be used with a 6.00–16/4 tire. The carcass was therefore built undersize with respect to its width. The diameter of the tire, however, was the same as would normally be the case for a 6.70–16/4 tire. Wire bead assemblies were incorporated in the carcass, the ends or lateral edges of the fabric plies being lapped around the beads, and the tread and sidewall portions of conventional vulcanizable rubber stocks were applied and splied in the usual manner to form the completed raw tire band. The weight of the tread employed was 12.5 lbs., this being a heavier tread than would usually be employed with the shoulder set used, but being of the conventional weight for a tire of the finally intended 6.70–16/4 size.

The undersize raw tire band was shaped in toroidal form and a curing bag was inserted therein. The raw tire casing and curing bag were placed in a mold having a smooth cavity corresponding in size to that which would be used for a conventional 6.00–16/4 tire. The mold was therefore undersize with respect to the finally intended size of the tire, to accommodate the undersize tire casing. This mold was lacking in conventional tread design, buffing rib, and lettering. Circulating hot water at 340° F. and 275 lbs. pressure was introduced into the curing bag while the mold was heated with steam at 245° F. The time for this curing operation was 25 minutes, during which the tire carcass, including the bead area, became substantially cured, while the tread and outer portion of the sidewall remained substantially uncured.

The tire casing was then removed from this mold, and placed in a mold having a larger cavity, corresponding to the size that would be conventionally employed to produce a 6.70–16/4 size tire. In order to cause the tire to fill out this mold the tire had to be expanded to the extent that the nylon carcass cords were stretched 6.0%. The rims or beads of the tire were maintained in place within the mold at a fixed diameter while the tire casing was expanded.

The vulcanization of the tire was completed in this larger mold by introducing hot water at 310° F. and 275 pounds pressure to the interior of the curing bag, while heating the mold with steam at 270° F. for 90 minutes. When the completely vulcanized tire was removed from the mold, the stretched nylon cords tended to recover some of the elongation, but were restrained to some extent by the tread and sidewall. The resulting tire therefor had the tread and sidewall rubber placed under compression by the nylon cords. The size of the completed tire was essentially 6.70–16/4.

As a result of the stretching of the nylon cords, the tire showed less growth on inflation compared to a tire made by conventional methods. Thus, a conventional nylon tire, after standing for 24 hours at normal inflation pressure, was observed to have increased 11.8% in cross-section, based on the cross-section of the mold. In contrast to this, the tire of the present invention under similar conditions showed an increase of only 7.1% in cross-section. Even after such growth had taken place, the improved tire was still 1.7% smaller in cross-section than the mold size, indicating that the growth was not sufficient to place the rubber of the tread and sidewall under undue tension. By contrast, the conventional tire was 0.8% larger in cross-section than mold size, indicating a definite tendency to place the tread and sidewall rubber under undesirable tension.

Furthermore, the conventional tire continues to grow throughout extended periods of service whereas the tire made by the improved method, in which the textile reinforcement is stretched to the extent described, attains a substantially constant size after a relatively brief period of service, and thereafter does not display appreciable further growth. These results are summarized in Table I.

TABLE I

*Growth measurements*

|  | Mold Cavity Size | Inflated Tire Size | Growth in 24 hrs. (based on size of mold cavity) |
|---|---|---|---|
| Nylon Tire Made By Conventional Method: | *Inches* | *Inches* | *Percent* |
| Cross-section | 6.219 | 6.95 | +11.8 |
| Outside diameter | 29.250 | 29.470 | +0.7 |
| Nylon Tire Made By Improved Method: | | | |
| Cross-section | 6.219 | 6.66 | +7.1 |
| Outside diameter | 29.250 | 28.750 | −1.7 |

Table I also shows that the inflated conventional tire is larger than the mold cavity in which it was molded, while the present tire is smaller than the mold cavity, even after inflation. This is indicative of the tendency of the stretched cords to place the rubber under compression, thereby drawing the tire down to a smaller size.

Tires made according to the invention were also subjected to tests by exposure to ozone while running the tire under load on a test wheel. The improved tire developed no groove cracking under the condition of the test, while a conventional tire, under the same conditions, cracked badly. This improvement in resistance to cracking is a direct consequence of the decreased tendency to growth, whereby the rubber of the tread and sidewall is not subjected to any great tensile strains. This also has a beneficial effect on resistance of the rubber to abrasion, and hence tends to improve the tread wear.

Nylon cords were extracted from tires produced in this manner and stress-strain measurements were made on the cords. These measurements were compared to measurements on the raw nylon cords of the character used in fabricating the carcass plies, with the result indicated in Table II.

TABLE II

*Elongation measurements*

|  | Conventional Raw Nylon Cords | Nylon Cords Extracted From Improved Tire |
|---|---|---|
| Percent Stretch at 10# load | 12.37 | 11.48 |
| Percent Stretch at 20# load | 19.16 | 18.32 |
| Percent Stretch at Break | 27.26 | 25.96 |

The results in Table I show that as a result of the stretching of the nylon cords which took place during the final cure of the tire, the cords acquired a permanent elongation, as indicated by the decreased stretch values.

The invention is preferably practiced with nylon reinforcing elements, because the high stretch characteristics of nylon have heretofore made it difficult to construct a nylon tire that was not highly susceptible to growth. The nylon carcass tire produced by this method substantially retains the excellent strength characteristics of the nylon, and the good flexing characteristics, high temperature resistance, and low water absorption of the nylon also remain unimpaired. Thus, the desirable qualities of the nylon have been retained, while greatly reducing the undesirable tendency to growth. Furthermore, by removing this tendency to growth by stretching the nylon after the tire is assembled, there has been produced a tire in which the tread and sidewall rubber are either in a state of substantial compression or in a substantially reduced state of tension by reason of the tendency of the nylon to recover some of the elongation imparted to it during manufacture of the tire.

It should be noted that the benefits of the present invention are not obtainable by prestretching the nylon before it is assembled in the tire, as has heretofore been suggested, because there would be an inappreciable amount of contraction of the nylon after the cured tire is removed from the mold. Such prestretching procedures result in relatively inappreciable improvement in growth characteristics of the tire, compared to the improvement obtained in the present invention wherein the nylon is stretched within the carcass and maintained in the stretched condition while the tire is vulcanized in its final shape. If it is attempted to obtain substantial reduction in the growth tendency of the tire by prestretching the nylon to an extreme degree at elevated temperature to impart substantial permanent set thereto, it is found that the fatigue properties of the nylon are seriously impaired with the result that the tire does not have satisfactory service life.

Rayon tires made in accordance with the method of the invention also display considerably reduced tendency to growth.

A further advantage of the present invention is that substantial economies are effected in the amount of textile material required for a tire of given size. For example, by the present method, a cotton cord tire may be made utilizing 3% to 5% by area less cord than is required for the conventional tire. This economy is the direct result of the fact that the tire is built on the building drum with less than the usual shoulder set, that is, less than the usual width of fabric, and the cord is thereafter stretched to the desired size previous to final vulcanization. Further economy of textile material in the tire is realized from the fact that it is unnecessary to incorporate additional plies of material in the carcass in an attempt to counteract to some extent the tendency to growth, as has frequently been the conventional practice.

As a result of the fact that the bead areas of the tire are vulcanized before final shaping in the tire mold, the method of the present invention, regardless of the type of reinforcing material used, results in improvements in the shaping of the bead area, largely eliminating defects which sometimes occur in conventional tire manufacture due to the fact that the uncured bead areas become improperly positioned or distorted in the mold.

The tensioning of the carcass cords which takes place in the present process has the further beneficial effect of properly aligning the cords at the desired cord angle and path throughout the length of the cords, thereby eliminating the uneven or wavy effect sometimes obtained by conventional methods. This in itself results in more uniform tires of superior quality and performance whether reinforced with natural filaments such as cotton, or synthetic filaments such as rayon or nylon, because the cord path and uniformity thereof has considerable influence on the flexing characteristics and life.

Having thus described my invention, what I claim and desire to protect by Letters Patent is:

1. A method of making a pneumatic tire comprising the steps of assemblying rubber tread and sidewall portions and a carcass of rubberized textile reinforcing elements, vulcanizing the carcass in the areas of the ends of said textile elements to fixedly anchor said elements against slippage, stretching said elements, and completing vulcanization of the assembly while maintaining said elements in the stretched condition.

2. A method as in claim 1 in which the textile reinforcing elements are cotton.

3. A method as in claim 1 in which the textile reinforcing elements are rayon.

4. A method as in claim 1 in which the textile reinforcing elements are nylon.

5. A method of making a pneumatic tire comprising the steps of assemblying rubber tread and sidewall portions and a carcass of rubberized textile reinforcing elements, vulcanizing the carcass in the areas of the ends of said textile elements to fixedly anchor said elements against slippage, stretching said elements by from 3% to 20%, and completing vulcanization of the assembly while maintaining said elements in the stretched condition.

6. A method of making a pneumatic tire including the steps of assembling vulcanizable rubber tread and sidewall portions over a reinforcing carcass comprising a plurality of plies of bias cut textile fabric skim-coated on each side with vulcanizable rubber carcass stock, said carcass containing near its marginal edges inextensible bead elements, the ends of said plies passing around said bead elements, vulcanizing the rubber in the area of said beads to fixedly anchor said plies against slippage around said beads, without appreciable vulcanization of said tread and sidewall portions, subsequently stretching said plies, and completing vulcanization of the assembly in the stretched condition.

7. A method as in claim 6 in which the textile fabric is cotton.

8. A method as in claim 6 in which the textile fabric is rayon.

9. A method as in claim 6 in which the textile fabric is nylon.

10. A method of making a pneumatic tire having a rubber tread portion, inextensible bead portions, rubber sidewall portions extending from said tread portion to said bead portions, and a carcass of rubberized textile reinforcing elements underlying said tread and said sidewall portions and running from bead to bead, comprising the steps of assembling said portions, fixedly anchoring said textile reinforcing elements at said bead portions by vulcanizing the carcass only in the area of said bead portions, expanding said carcass to extend said textile elements by at least 3%, and vulcanizing the assembly while maintaining said textile elements in said state of extension within the tire.

11. A method of making a pneumatic tire having a rubber tread portion, inextensible bead portions, rubber sidewall portions extending from said tread portion to said bead portions, and a carcass of rubberized cotton reinforcing elements underlying said tread and said sidewall portions and running from bead to bead, comprising the steps of assembling said portions, fixedly anchoring said cotton reinforcing elements at said bead portions by vulcanizing the carcass only in the tread of said bead portions, expanding said carcass to extend said cotton elements by at least 3%, and vulcanizing the assembly while maintaining said cotton elements in said state of extension within the tire.

12. A method of making a pneumatic tire having a rubber tread portion, inextensible bead portions, rubber sidewall portions extending from said tread portion to said bead portions, and a carcass of rubberized rayon reinforcing elements underlying said tread and said sidewall portions and running from bead to bead, comprising the steps of assembling said portions, fixedly anchoring said rayon reinforcing elements at said bead portions by vulcanizing the carcass only in the area of said bead portions, expanding said carcass to extend said rayon elements by from 4% to 6%, and vulcanizing the assembly while maintaining said rayon elements in said state of extension within the tire.

13. A method of making a pneumatic tire having a rubber tread portion, inextensible bead portions, rubber sidewall portions extending from said tread portion to said bead portions, and a carcass of rubberized nylon reinforcing elements underlying said tread and said sidewall portions and running from bead to bead, comprising the steps of assembling said portions, fixedly anchoring said nylon reinforcing elements at said bead portions by vulcanizing the carcass only in the area of said bead portions, expanding said carcass to extend said nylon elements by at least 3%, and vulcanizing the assembly while maintaining said nylon elements in said state of extension within the tire.

14. A method of making a pneumatic tire having a rubber tread portion, inextensible bead portions, rubber sidewall portions extending from said tread portion to said bead portions, and a carcass of rubberized nylon reinforcing elements underlying said tread and said sidewall portions and running from bead to bead, comprising the steps of assembling said portions, fixedly anchoring said nylon reinforcing elements at said bead portions by vulcanizing the carcass only in the area of said bead portions, expanding said carcass to extend said nylon elements by from 6% to 12%, and vulcanizing the assembly while maintaining said nylon elements in said state of extension within the tire.

15. A method of making a pneumatic tire having a rubber tread portion, inextensible bead portions, rubber sidewall portions extending from said tread portion to said bead portion, and a reinforcing carcass of a plurality of plies of textile tire fabric embedded in rubber underlying said tread and sidewall portions, said plies being wrapped around said beads, comprising the steps of assembling said portions, vulcanizing the rubber of said carcass to anchor the fabric plies against slippage upon subsequently applied tensile stress, without vulcanizing said tread and sidewall portions, expanding said carcass to stretch said fabric by from 3% to 20%, and vulcanizing said tread and sidewall portions while maintaining said fabric in said state of extension within the tire.

16. A method of making a pneumatic tire having a rubber tread portion, inextensible bead portions, rubber sidewall portions extending from said tread portion to said bead portion, and a reinforcing carcass of a plurality of plies of nylon tire fabric embedded in rubber underlying said tread and sidewall portions, said plies being wrapped around said beads, comprising the steps of assembling said portions, vulcanizing the rubber of said carcass to anchor the fabric plies against slippage upon subsequently applied tensile stress, without vulcanizing said tread and sidewall portions, expanding said carcass to stretch said fabric by from 3% to 20%, and vulcanizing said tread and sidewall portions while maintaining said fabric in said state of extension within the tire.

17. A method of making a pneumatic tire having a rubber tread portion, inextensible bead portions, rubber sidewall portions extending from said tread portion to said beads, and a reinforcing carcass of a plurality of plies of bias cut nylon fabric embedded in rubber underlying said tread and sidewall portions, said plies being wrapped around said beads, comprising the steps of assembling said portions, vulcanizing the rubber of said carcass in the area of said beads to anchor the nylon plies against slippage upon subsequently applied tensile stress, without vulcanizing the remainder of the tire, expanding said carcass to stretch said nylon by 3% to 20%, and vulcanizing the remainder of the tire while maintaining said nylon in said state of extension within the tire.

18. A method of making a pneumatic tire comprising the steps of assembling vulcanizable rubber tread and sidewall portions on a carcass including a plurality of superimposed plies of nylon tire fabric skim-coated with vulcanizable rubber carcass stock, said nylon fabric being wrapped around inextensible wire beads embedded in said carcass, and said carcass being made undersize with respect to the finally intended size of the tire, vulcanizing the bead areas of the assembly without vulcanizing the tread and sidewalls, placing the assembly in a tire mold having a cavity corresponding in size to the finally intended size of the tire, expanding the carcass by application of internal pressure to cause it to conform to the walls of said cavity while maintaining the beads at a fixed diameter, thereby stretching the nylon fabric, and completely vulcanizing the assembly while maintaining said nylon fabric in said stretched condition.

19. A method of making a pneumatic tire comprising the steps of assembling vulcanizable rubber tread and sidewall portions on a carcass of nylon fabric skim-coated with vulcanizable rubber carcass stock, said nylon fabric being wrapped around inextensible wire beads embedded in said carcass, and said carcass being made undersize with respect to the finally intended size of the tire, shaping said assembly in tire form, placing said assembly in a tire mold having a cavity which accommodates the assembly without substantial stretching thereof, applying a fluid medium under pressure to the interior of the tire to cause the assembly to fill out the mold cavity under pressure, vulcanizing the carcass while confined in the mold without substantial vulcanization of the tread and sidewalls, removing the assembly from said mold, placing the assembly in a tire mold having a larger cavity than the first mold and corresponding in size to the finally intended size of the tire, expanding the carcass by application of internal fluid pressure while maintaining the beads at a fixed diameter to fill out said mold cavity, thereby stretching said nylon fabric, and completely vulcanizing the tire while maintaining said nylon fabric in said stretched condition and while confining the tire in said mold cavity under pressure in the desired shape.

EDWARD H. WALLACE.

REFERENCES CITED

The following references are of record in the file of this patent:

UNITED STATES PATENTS

| Number | Name | Date |
|---|---|---|
| 1,389,960 | Mell | Sept. 6, 1921 |
| 2,451,973 | Purdy | Oct. 19, 1948 |
| 2,476,884 | Maynard | July 19, 1949 |
| 2,497,226 | McNeill | Feb. 14, 1950 |
| 2,541,506 | Cuthbertson | Feb. 13, 1951 |